United States Patent
Hiroshi et al.

(10) Patent No.: US 7,134,452 B2
(45) Date of Patent: Nov. 14, 2006

(54) DISC VALVE

(75) Inventors: Ohshima Hiroshi, Kitakyushu (JP); Taniguchi Takahiro, Kitakyushu (JP)

(73) Assignee: Toto Ltd., Kitakyushu (JP)

( * ) Notice: Subject to any disclaimer, the term of this patent is extended or adjusted under 35 U.S.C. 154(b) by 79 days.

(21) Appl. No.: 10/525,047

(22) PCT Filed: Aug. 19, 2002

(86) PCT No.: PCT/JP02/08345

§ 371 (c)(1),
(2), (4) Date: Feb. 18, 2005

(87) PCT Pub. No.: WO2004/016973

PCT Pub. Date: Feb. 26, 2004

(65) Prior Publication Data

US 2006/0162791 A1    Jul. 27, 2006

(51) Int. Cl.
*F16K 11/074* (2006.01)
(52) U.S. Cl. .................. 137/625.41; 251/117
(58) Field of Classification Search ........... 137/625.17, 137/625.41; 251/117
See application file for complete search history.

(56) References Cited

U.S. PATENT DOCUMENTS

| | | | | |
|---|---|---|---|---|
| 2,106,942 A | * | 2/1938 | Beehler et al. | ................. 137/94 |
| 2,377,473 A | * | 6/1945 | Wolcott | ................... 137/625.11 |
| 4,823,841 A | * | 4/1989 | Graber | ................... 137/625.41 |
| 5,100,565 A | * | 3/1992 | Fujiwara et al. | ............. 251/368 |
| 5,704,588 A | | 1/1998 | Korfgen et al. | |
| 5,934,321 A | * | 8/1999 | Miya et al. | ............ 137/625.41 |
| 6,904,935 B1 | * | 6/2005 | Welty et al. | ........... 137/625.17 |

FOREIGN PATENT DOCUMENTS

| | | |
|---|---|---|
| DE | 195 34 849 A1 | 3/1997 |
| JP | 48-40489 | 11/1973 |
| JP | 4-302781 | 10/1992 |
| JP | 8-128541 | 5/1996 |
| JP | 8-159304 | 6/1996 |
| JP | 9-89124 | 3/1997 |
| JP | 2000-283302 | 10/2000 |

OTHER PUBLICATIONS

International Search Report, completed Nov. 19, 2002.

* cited by examiner

*Primary Examiner*—John Fox
(74) *Attorney, Agent, or Firm*—Griffin & Szipl, P.C.

(57) ABSTRACT

A disk valve comprises an inlet port, an outlet port, a first disk provided with a first through hole communicating with the inlet port and extending axially and a second through hole communicating with the outlet port and extending axially, and a second disk provided with a concave capable of communicating with the first through hole and the second through hole of the first disk on one end face and slidably and movably contacting one end face of the first disk at the one end face. A closed space is formed radially outside the second disk, and the second disk slides relative to the first disk to adjust the degree of overlap between the concave of the second disk and the first through hole of the first disk. The slidably and movably contacting part between the first disk and the second disk is self-lubricated. The disk valve further comprises a communication passage for always placing the first through hole into communication with the closed space radially outside the second disk. A portion of the one end face of the first disk adjacent to the part slidably and movably contacting the second disk opposes the closed space

8 Claims, 7 Drawing Sheets

(a)

(b)　(c)　(d)

DISC VALVE

This is a National Phase Application in the United States of International Patent Application No. PCT/JP02,08345, filed Aug. 19, 2002, the entire disclosure of which is hereby incorporated by reference.

TECHNICAL FIELD

The present invention relates to a disk valve suitable for use in single lever water combination faucets, water faucets, or the like.

BACKGROUND ART

There have been used disk valves for single lever water combination faucets, water faucets, or the like, comprising an inlet port, an outlet port, a first disk provided with a first through hole communicating with the inlet port and extending axially and a second through hole communicating with the outlet port and extending axially, and a second disk provided with a concave capable of communicating with the first through hole and the second through hole of the first disk on one end face and slidably and movably contacting one end face of the first disk at the one end face, wherein a closed space is formed radially outside the second disk, and the second disk slides relative to the first disk to adjust the degree of overlap between the concave of the second disk and the first through hole of the first disk.

In conventional disk valves, the slidably and movably contacting part between the first disk and the second disk is lubricated by oil such as silicon grease, or the like.

The conventional disk valves have a disadvantage in that oil adhered to the slidably and movably contacting part is carried away by water flowing from the first through hole of the first disk to the second through hole of the first disk through the concave of the second disk to slightly disperse into water discharging from the disk valve, thereby gradually being diminished to cause poor maneuverability of the disk valves.

DISCLOSURE OF INVENTION

An object of the present invention is to provide a disk valve comprising an inlet port, an outlet port, a first disk provided with a first through hole communicating with the inlet port and extending axially and a second through hole communicating with the outlet port and extending axially, and a second disk provided with a concave capable of communicating with the first through hole and the second through hole of the first disk on one end face and slidably and movably contacting one end face of the first disk at the one end face, wherein a closed space is formed radially outside the second disk, and the second disk slides relative to the first disk to adjust the degree of overlap between the concave of the second disk and the first through hole of the first disk, and wherein dispersion of the oil into the discharging water is suppressed and good maneuverability is maintained for a long time.

In accordance with the present invention, there is provided a disk valve comprising an inlet port, an outlet port, a first disk provided with a first through hole communicating with the inlet port and extending axially and a second through hole communicating with the outlet port and extending axially, and a second disk provided with a concave capable of communicating with the first through hole and the second through hole of the first disk on one end face and slidably and movably contacting one end face of the first disk at the one end face, wherein a closed space is formed radially outside the second disk, and the second disk slides relative to the first disk to adjust the degree of overlap between the concave of the second disk and the first through hole of the first disk, and wherein the slidably and movably contacting part between the first disk and the second disk is self-lubricated, further comprising a communication passage for always placing the first through hole into communication with the closed space radially outside the second disk, and wherein a portion of the one end face of the first disk adjacent to the part slidably and movably contacting the second disk opposes the closed space and the communication passage is a groove formed on the one end face of the first disk.

In accordance with another aspect of the present invention, there is provides a disk valve comprising an inlet pod, and outlet port, a first disk provided with a first through hole communicating with the inlet port and extending axially and a second through hole communicating with the outlet port and extending axially, and a second disk provided with a concave capable of communicating with the first through hole and the second through hole of the first disk on one end face and slidably and movably contacting one end face of the first disk at the one end face, wherein a closed space is formed radially outside the second disk, and the second disk slides relative to the first disk to adjust the degree of overlap between the concave of the second disk and the first through hole of the first disk, and wherein the slidably and movably contacting part between the first disk and the second disk is self-lubricated, further comprising a communication passage for always placing the first through hole into communication with the closed space radially outside the second disk, and wherein a portion of the one end face of the first disk adjacent to the part slidably and movably contacting the second disk opposes the closed space and the communication passage is a part of the end portion of the first through hole formed in the first disk at the side of the one end face of the first disk.

In the disk valve of the present invention, no oil is necessary for lubricating the slidably and movably contacting part between the first disk and the second disk because the contacting part is self-lubricated. Therefore, dispersing of oil into discharging water is suppressed.

The slidably and movably contacting part is self-lubricated when covered by a water film. In the disk valve of the present invention, the part of the one end face of the first disk opposing the closed space radially outside the second disk always contacts water because the closed space radially outside the second disk always communicating with the first through hole through the communication passage is always filled up with water. Therefore, at the same time as the second disk slides relative to the first disk, the slidably and movably contacting part between the first disk and the second disk is covered by a water film and self-lubricated.

When the disk valve is kept in closed condition for a long time, the sliding resistance when the second disk starts to slide relative to the first disk might be expected to increase if the water film covering the slidably and movably contacting part should be diminished by drying. In the disk valve of the present invention, however, the increase of the sliding resistance is prevented for the following reason. The first disk is always forced against the second disk by the primary pressure, i.e. the pressure upstream side of the disk valve. In the disk valve of the present invention, the primary pressure always works on the part of the end face of the first disk opposing the closed space to force the first disk away from the second disk, thereby decreasing the load acting on the slidably and movably contacting part between the first disk and the second disk. Therefore, even if the slidably and movably contacting part lacks a water film when the second disk starts to slide relative to the first disk, the increase of sliding resistance is suppressed, and the second disk can easily slide relative to the first disk.

In the disk valve of the present invention, good maneuverability is maintained for a long time because the second disk can easily start to slide relative to the first disk, and the slidably and movably contacting part is covered by a water film to be self-lubricated at the same time as the second disk starts to slide relative to the first disk.

In a preferred embodiment of the present invention, the disk valve further comprises an annular third disk slidably and movably contacting the other end face of the second disk at one end face, the second disk contacts the third disk to always cover the central opening of the third disk and slides relative to the third disk, the slidably and movably contacting part between the second disk and the third disk is self-lubricated, and a part of the one end face of the third disk adjacent to the part slidably and movably contacting the second disk opposes the closed space.

When a space formed between the first disk and the third disk and radially outside the second disk is the closed space always communicating with the first through hole, the closed space can be easily sealed.

In another aspect of the present invention, there is provided a disk valve comprising an inlet port, an outlet port, a first disk provided with a first through hole communicating with the inlet port and extending axially and a second through hole communicating with the outlet port and extending axially, and a second disk provided with a concave capable of communicating with the first through hole and the second through hole of the first disk on one end face and slidably and movably contacting one end face of the first disk at the one end face, wherein a closed space is formed radially outside the second disk, and the second disk slides relative to the first disk to adjust the degree of overlap between the concave of the second disk and the first through hole of the first disk, further comprising an annular third disk slidably and movably contacting the other end face of the second disk at one end face, wherein the second disk contacts the third disk to always cover the central opening of the third disk and slides relative to the third disk, the slidably and movably contacting part between the first disk and the second disk and the slidably and movably contacting part between the second disk and third disk are self-lubricated, a portion of the one end face of the first disk adjacent to the part slidably and movably contacting the second disk and a portion of the one end face of the third disk adjacent to the part slidably and movably contacting the second disk oppose the closed space, and a communication passage is formed in the side wall of the concave of the second disk to place the concave into communication with the closed space.

In the disk valve of the present invention, water flows into the closed space to be stored in the closed space when the concave of the second disk communicates with the first through hole of the first disk. The water stored in the closed space wets the portion of the one end face of the first disk opposing the closed space and the portion of the one end face of the third disk opposing the closed space. Thus, at the same time as the second disk slides relative to the first disk and the third disk, the slidably and movably contacting part between the first disk and the second disk and the slidably and movably contacting part between the second disk and the third disk are covered by water films and self-lubricated.

When the disk valve is kept in closed condition for a long time, the water stored in the closed space discharges from the disk valve through the communication passage formed in the side wall of the concave of the second disk, the concave of the second disk, the second through hole of the first disk and the outlet port. However, the water can be retained in the closed space by decreasing the cross sectional area of the communication passage formed in the side wall of the concave of the second disk. Thus, the portion of the one end face of the first disk opposing the closed space and the portion of the one end face of the third disk opposing the closed space can be kept wet.

In a preferred embodiment of the present invention, the disk valve further comprises a lever that passes through the central opening of the third disk to engage the second disk and a casing for accommodating the first disk, second disk and the third disk, wherein a second closed space is formed in the casing adjacent to the closed space radially outside the second disk and separated from the closed space radially outside the second disk by the second disk and the third disk, and further comprises an oil supply passage for placing the second closed space into communication with the open space outside the casing.

When the second closed space is filled with oil such as silicon grease, the oil is fed to the slidably and movably contacting part between the second disk and the third disk through the central opening of the third disk to increase smoothness of sliding movement of the second disk relative to the third disk, thereby enhancing maneuverability of the water faucet incorporating the disk valve of the present invention. The high maneuverability of the water faucet can be maintained for a long time by supplying the second closed space with oil through the oil supply passage.

In a preferred embodiment of the present invention, the oil supply passage is formed in a portion of the disk valve exposed to the space outside a faucet body with which the disk valve is assembled.

When the oil supply passage is formed in a portion of the disk valve exposed to the space outside a faucet body with which the disk valve is assembled, oil can be supplied into the casing from the space outside the casing through the oil supply passage without taking the disk valve out of the faucet body.

In a preferred embodiment of the present invention, the inlet port is provided with a hot water inlet port and a cool water inlet port which are independent of each other, the first through hole of the first disk is provided with a hole communicating with the hot water inlet port and a hole communicating with the cool water inlet port, the concave of the second disk is capable of communicating with the hole of the first disk communicating with the hot water inlet port and the hole of the first disk communicating with the cool water inlet port, the second disk slides relative to the first disk to adjust the degree of overlap between the concave of the second disk and the hole of the first disk communicating with the hot water inlet port and the degree of overlap between the concave of the second disk and the hole of the first disk communicating with the cool water inlet port, and the communication passage for placing the first through hole of the first disk into communication with the closed space radially outside the second disk places the hole of the first disk communicating with the hot water inlet port and/or the hole of the first disk communicating with the cool water inlet port into communication with the closed space radially outside the second disk.

The disk valve having the aforementioned structure can be used in a single lever water combination faucet.

In accordance with the present invention, there is provided a water faucet comprising any one of the aforementioned disk valves.

A water faucet comprising any one of the aforementioned disk valves can suppress the dispersion of oil into the discharging water and keep high maneuverability for a long time.

BEST MODE FOR CARRYING OUT THE INVENTION

A disk valve in accordance with the first preferred embodiment of the present invention will be described.

Figure 1:
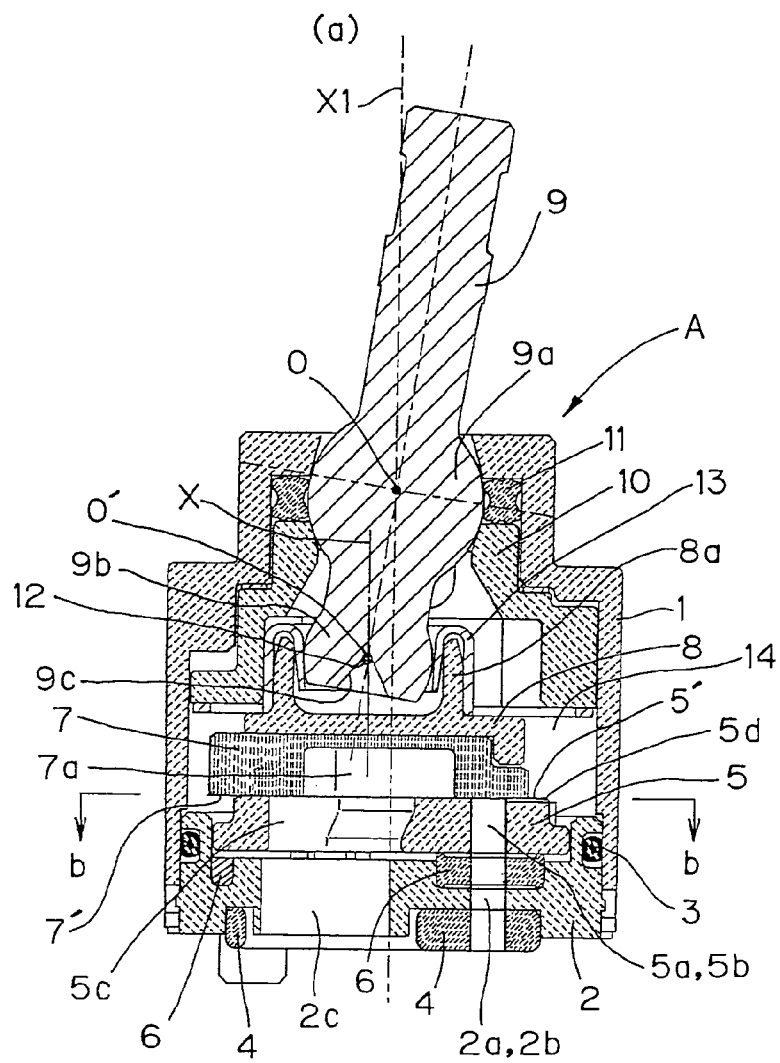
FIG. 1 is a set of structural views of a disk valve in accordance with the first preferred embodiment of the present invention. (a) is a longitudinal sectional view and (b) is a view in the direction of arrows b—b in (a). The portion of (a) below the arrows b—b is a sectional view taken along zigzag line a—a in (b).
Figure 1:
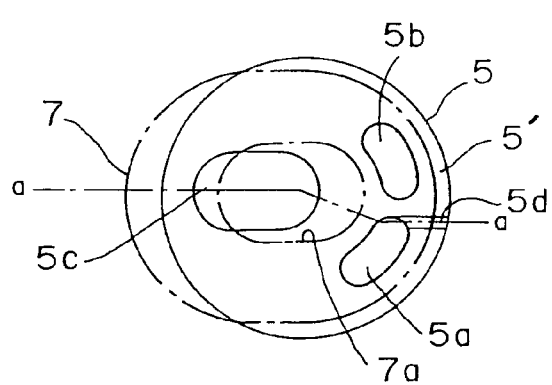
Figure 2:
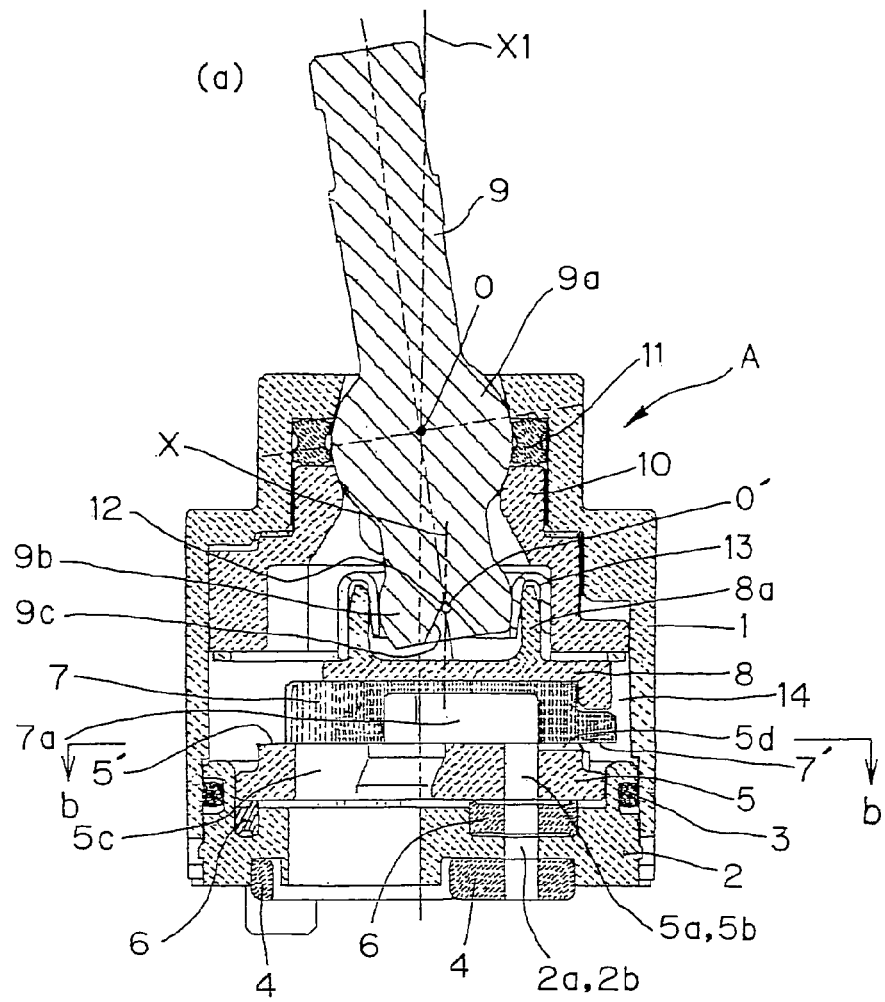
FIG. 2 is a set of structural views of the disk valve in accordance with the first preferred embodiment of the present invention. (a) is a longitudinal sectional view and (b), (c) and (d) are views in the direction of arrows b—b in (a). The portion of (a) below the arrows b—b is a sectional view taken along zigzag line a—a in (b).
Figure 2:
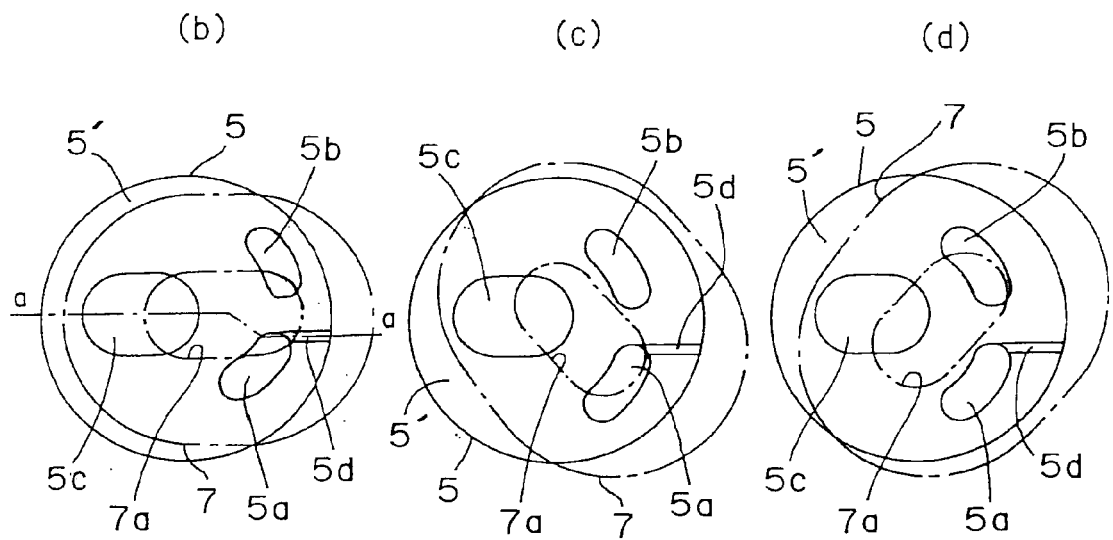

As shown in FIGS. 1 and 2, a disk valve A comprises a cylindrical cartridge case 1 made of synthetic resin and provided with a large diameter portion and a small diameter portion, and a disk-shaped packing guide 2 made of synthetic resin and fitted in and fixed to the end of the large diameter portion of the cartridge case 1. An O-ring 3 seals the contacting part between the inner circumferential surface of the cartridge case 1 and the outer circumferential surface of the packing guide 2. A hot water inlet port 2a, a cool water inlet port 2b and a mixed water outlet port 2c are formed in the packing guide 2 independently of each other to penetrate the packing guide 2 axially. A gasket 4 is fitted in the packing guide 2 to seal the connections between the hot water inlet port 2a, the cool water inlet port 2b, the mixed water outlet port 2c and a hot water inlet port, a cool water inlet port and a mixed water outlet port of a faucet body not shown in figures.

A disk-shaped first disk 5 made of ceramic is disposed in the cartridge case 1 to be fitted in and fixed to the packing guide 2. A first through hole 5a, a second through hole 5b and a third through hole 5c are formed in the first disk 5 independently of each other to extend in the axial direction, thereby communicating with the hot water inlet port 2a, the cool water inlet port 2b and the mixed water outlet port 2c, respectively. The first disk 5 is provided with a groove 5d at one end face 5' distanced from the packing guide 2. The groove 5d extends from the first through hole 5a to the outer peripheral portion of the end face 5'. The end face 5' is mirror finished. A gasket 6 is disposed to seal the communicating parts between the first through hole 5a, the second through hole 5b, the third through hole 5c and the hot water inlet port 2a, the cool water inlet port 2b, the mixed water outlet port 2c.

An oval-shaped second disk 7 made of ceramic is disposed in the cartridge case 1. The second disk 7 slidably and movably contacts the mirror finished end face 5' of the first disk 5 at a mirror finished one end face 7'. The end face 7' is coated with a self-lubricating material such as DLC (diamond like carbon). The end face 7' is provided with a concave 7a capable of communicating with the first through hole 5a, the second through hole 5b and the third through hole 5c of the first disk 5.

A gripper 8 made of synthetic resin is disposed in the cartridge case 1. The gripper 8 grips the other end face of the second disk 7 to be assembled with the second disk 7 as a unitary body, thereby forming a part of the second disk 7. The gripper 8 is provided with a boss 8a at one end face distanced from the second disk 7.

A lever 9 made of metal or synthetic resin is inserted in the cartridge case 1 through the end of the small diameter portion of the cartridge case 1. The lever 9 is provided with a spherical bulge 9a at the portion penetrating the end of the small diameter portion of the cartridge case 1. A lever guide 10 is disposed in the cartridge case 1. The spherical bulge 9a slidably and movably contacts the lever guide 10. The lever guide 10 supports the spherical bulge 9a to allow the spherical bulge 9a to rotate three dimensionally around the ball center O. A gasket 11 is disposed to seal the end of the small diameter portion of the cartridge case 1 penetrated by the lever 9.

One end of the lever 9 inserted in the cartridge case 1 forms a semi-spherical bulge 9b. The semi-spherical bulge 9b is inserted in the boss 8a of the gripper 8. The semi-spherical bulge 9b is provided with a V-shaped groove 9c at a cut surface forming an end face of the lever 9. The bottom of the V-shaped groove 9c engages a pin 12. The pin 12 crosses the central axis X of the boss 8a at right angles and penetrates the boss 8a. The pin 12 extends through the ball center O' of the semi-spherical bulge 9b. A gasket 13 fits in the boss 8a. The semi-spherical bulge 9b slidably and movably contacts the gasket 13.

A closed space 14 is formed radially outside the second disk 7. The closed space 14 extends close to the spherical bulge 9a of the lever 9. The first through hole 5a always communicates with the closed space 14 through the groove 5d formed on the end face 5' of the first disk 5.

Operation of the disk valve A will be described.

In the condition shown in FIG. 1, the concave 7a communicates with the third through hole 5c, but does not communicate either the first through hole 5a or the second through hole 5b. The first through hole 5a, the second through hole 5b and the third through hole 5c are closed by the second disk 7. Hot water supplied from the hot water inlet port of the faucet body to the first through hole 5a flows into the closed space 14 always communicating with the first through hole 5a through the groove 5d to fill up the closed space 14 with the hot water. The part of the end face 5' opposing the closed space 14 always contacts water.

The mirror finished end face 5' tightly contacts the mirror finished end face 7' to seal the slidably and movably contacting part between the first disk 5 and the second disk 7. The hot water charged in the first through hole 5a and the closed space 14 and the cool water charged in the second through hole 5b do not flow into the third through hole 5c. Therefore, mixed water does not discharge from the disk valve A into the mixed water outlet port of the faucet body.

When the lever 9 rotates anticlockwise around an axis extending perpendicularly to the drawing sheet to pass through the ball center O in FIG. 1, the second disk 7 slides relative to the first disk 5, and the disk valve A comes into the condition shown in FIGS. 2(a) and 2(b). In said condition, the concave 7a communicates with the first through hole 5a, the second through hole 5b and the third through hole 5c. The hot water supplied to the first through hole 5a through the hot water inlet port of the faucet body and the cool water supplied to the second through hole 5b through the cool water inlet port of the faucet body flow into the third through hole 5c through the concave 7. Thus, mixed water discharges from the disk valve A into the mixed water outlet port of the faucet body. The flow rate of the mixed water discharging from the disk valve A into the mixed water outlet port of the faucet body is controlled by controlling the rotating angle of the lever 9 around the axis extending perpendicularly to the drawing sheet to pass through the ball center O in FIG. 1.

When the lever 9 rotates around an axis X1 extending in parallel with the axis X through the ball center O, the second disk 7 slidably rotates relative to the first disk 5, and the disk valve A comes into the condition shown in FIG. 2(c). In said condition, the concave 7a communicates with the first through hole 5a and the third through hole 5c. The hot water supplied to the first through hole 5a through the hot water inlet port of the faucet body flows into the third through hole 5c through the concave 7. Thus, the hot water discharges from the disk valve A into the mixed water outlet port of the faucet body.

When the lever 9 rotates around the axis X1 extending in parallel with the axis X through the ball center O, the second disk 7 slidably rotates relative to the first disk 5, and the disk valve A comes into the condition shown in FIG. 2(d). In said condition, the concave 7a communicates with the second through hole 5b and the third through hole 5c. The cool water supplied to the second through hole 5b through the cool water inlet port of the faucet body flows into the third through hole 5c through the concave 7. Thus, the cool water discharges from the disk valve A into the mixed water outlet port of the faucet body.

When the rotating angle of the lever 9 around the axis X1 is controlled, the degree of overlap between the concave 7a and the first through hole 5a is controlled and the degree of overlap between the concave 7a and the second through hole 5b is controlled, whereby mixing ratio of hot water and cool water is controlled to control the temperature of the mixed water discharging from the disk valve A.

In the disk valve A, no oil is necessary for lubricating the slidably and movably contacting part between the first disk 5 and the second disk 7 because the end face 7' is coated with a self-lubricating material and the slidably and movably contacting part between the first disk 5 and the second disk 7 is self-lubricated. Therefore, dispersing of oil into discharging water is suppressed.

The slidably and movably contacting part between the first disk 5 and the second disk 7 is self-lubricated when covered by a water film. In the disk valve A, the part of the end face 5' opposing the closed space 14 always contacts water because the closed space 14 always communicating with the first through hole 5a through the groove 5d is always filled with the water. Therefore, at the same time as the second disk 7 slides relative to the first disk 5, the slidably and movably contacting part between the first disk 5 and the second disk 7 is covered by a water film and self-lubricated. Therefore, a small force applied to the lever 9 can easily slide the second disk 7 relative to the first disk 5.

When the disk valve A is kept in closed condition for a long time, the sliding resistance when the second disk 7 starts to slide relative to the first disk 5 might be expected to increase if the water film covering the slidably and movably contacting part should be diminished by drying. In the disk valve A, however, the increase of the sliding resistance is prevented for the following reason. The first disk 5 is always forced against the second disk 7 by the primary pressure, i.e. the pressure upstream side of the disk valve. In the disk valve A, the primary pressure also always works on the part of the end face 5' of the first disk 5 opposing the closed space 14 to force the first disk 5 away from the second disk 7, thereby decreasing the load acting on the slidably and movably contacting part between the first disk 5 and the second disk 7. Therefore, even if the slidably and movably contacting part lacks a water film when the second disk 7 starts to slide relative to the first disk 5, the increase of sliding resistance is suppressed, and the second disk 7 can easily slide relative to the first disk 5. As a result, a small force applied to the lever 9 can easily slide the second disk 7 relative to the first disk 5.

In the disk valve A, good maneuverability is maintained for a long time because the second disk 7 can easily start to slide relative to the first disk 5, and the slidably and movably contacting part is covered by a water film to be self-lubricated at the same time as the second disk 7 starts to slide relative to the first disk 5.

A disk valve in accordance with the second preferred embodiment of the present invention will be described.

Figure 3:
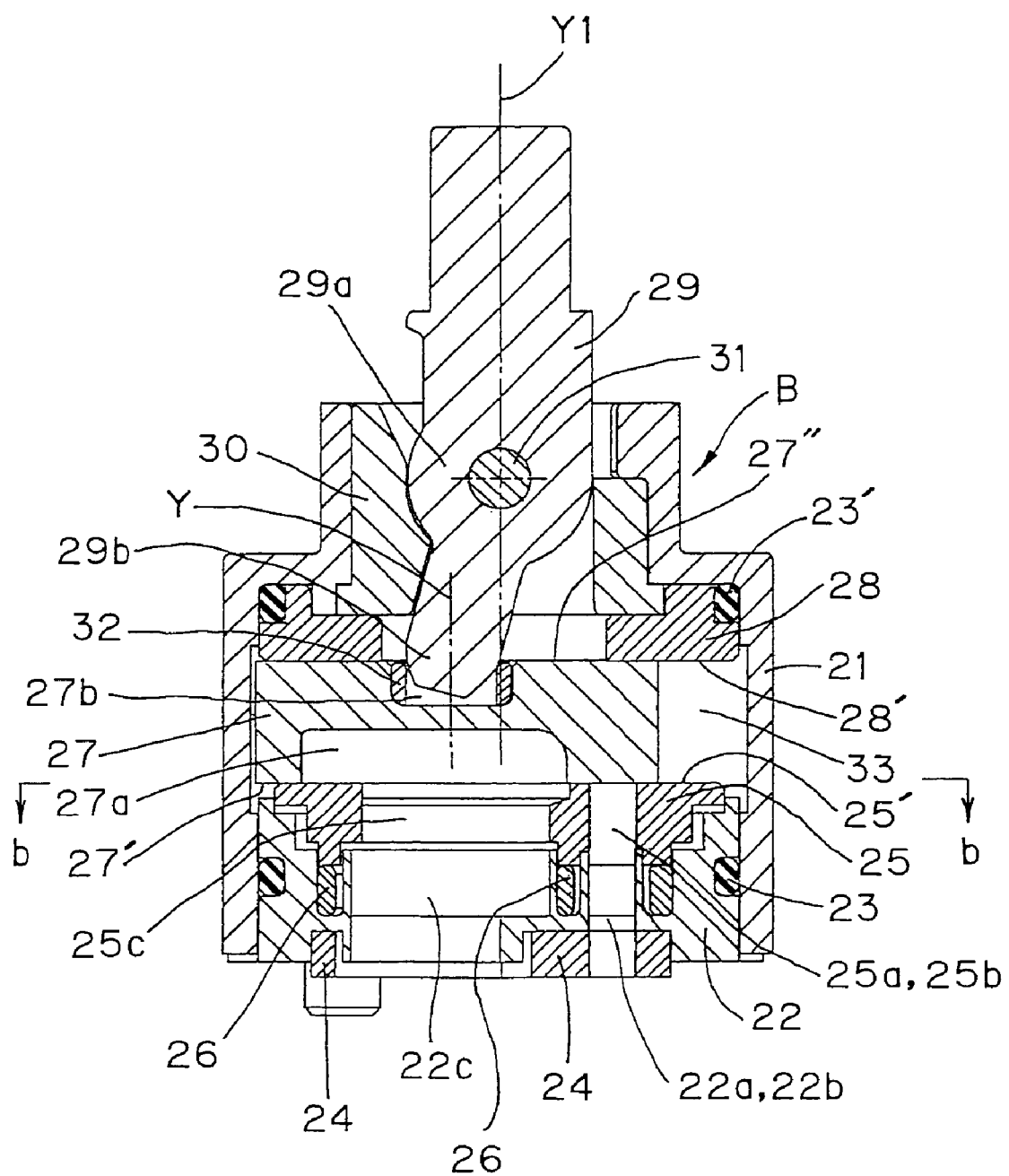
FIG. 3 is a longitudinal sectional view of a disk valve in accordance with the second preferred embodiment of the present invention. The portion below the arrows b—b is a sectional view taken along zigzag line similar to that in FIG. 1(a).
Figure 4:
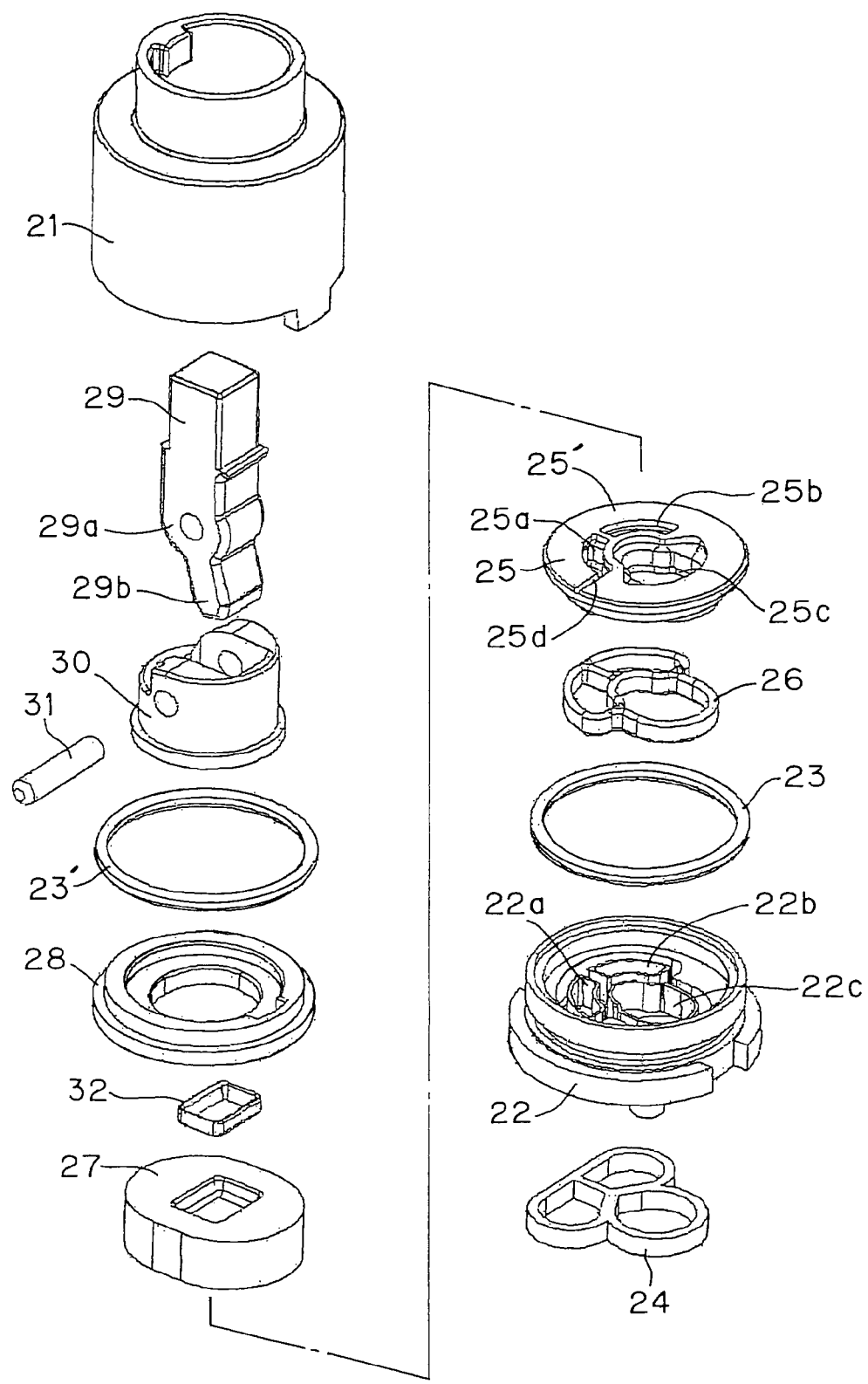
FIG. 4 is an exploded perspective view of the disk valve in accordance with the second preferred embodiment of the present invention.
Figure 5:
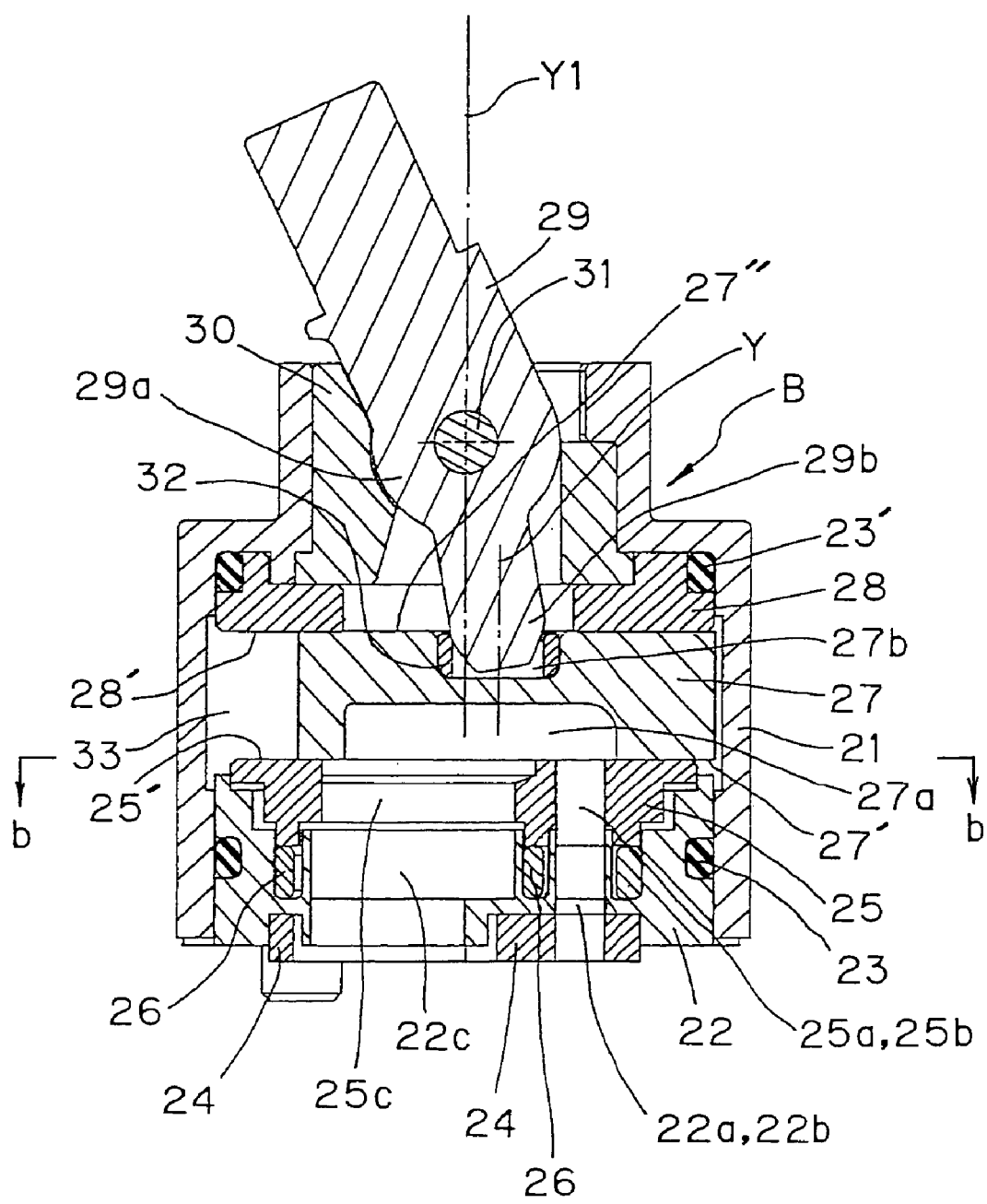
FIG. 5 is a longitudinal sectional view of a disk valve in accordance with the second preferred embodiment of the present invention. The portion below the arrows b—b is a sectional view taken along zigzag line similar to that in FIG. 2(a).

As shown in FIGS. 3 to 5, a disk valve B comprises a cylindrical cartridge case 21 made of synthetic resin and provided with a large diameter portion and a small diameter portion, and a disk-shaped packing guide 22 made of synthetic resin and fitted in and fixed to the end of the large diameter portion of the cartridge case 21. An O-ring 23 seals the contacting part between the inner circumferential surface of the cartridge case 21 and the outer circumferential surface of the packing guide 22. A hot water inlet port 22a, a cool water inlet port 22b and a mixed water outlet port 22c are formed in the packing guide 22 independently of each other to penetrate the packing guide 22 axially. A gasket 24 is fitted in the packing guide 22 to seal the connections between the hot water inlet port 22a, the cool water inlet port 22b, the mixed water outlet port 22c and a hot water inlet port, a cool water inlet port and a mixed water outlet port of a faucet body not shown in figures.

A disk-shaped first disk 25 made of ceramic is disposed in the cartridge case 21 to be fitted in and fixed to the packing guide 22. A first through hole 25a, a second through hole 25b and a third through hole 25c are formed in the first disk 25 to extend axially, thereby communicating with the hot water inlet port 22a, the cool water inlet port 22b and the mixed water outlet port 22c, respectively. The first disk 25 is provided with a groove 25d at one end face 25' distanced from the packing guide 22. The groove 25d extends from the first through hole 25a to the outer peripheral portion of the end face 25'. The end face 25' is mirror finished. A gasket 26 is disposed to seal the communicating parts between the first through hole 25a, the second through hole 25b, the third through hole 25c and the hot water inlet port 22a, the cool water inlet port 22b, the mixed water outlet port 22c.

An oval-shaped second disk 27 made of ceramic is disposed in the cartridge case 21. The second disk 27 slidably and movably contacts the mirror finished end face 25' of the first disk 25 at a mirror finished one end face 27'. The end face 27' is coated with a self-lubricating material such as DLC (diamond like carbon). The end face 27' is provided with a concave 27a capable of communicating with the first through hole 25a, the second through hole 25b and the third through hole 25c of the first disk 25.

The other end face 27" of the second disk 27 is also mirror finished and coated with a self-lubricating material such as DLC. The end face 27" is provided with a concave 27b.

An annular third disk 28 made of ceramic is disposed in the cartridge case 21. The third disk 28 is fitted in and fixed to the cartridge case 21. An O-ring 23' seals the contacting part between the inner circumferential surface of the cartridge case 21 and the outer circumferential surface of the third disk 28. An end face 28' of the third disk 28 opposite the second disk 27 is mirror finished.

The mirror finished other end face 27" of the second disk 27 always covers the central opening of the third disk 28 and slidably and movably contacts the mirror finished end face 28' of the third disk 28.

A lever 29 made of metal or synthetic resin is inserted in the cartridge case 21 through the end of the small diameter portion of the cartridge case 21. The lever 29 is inserted in a cylindrical lever guide 30. The lever guide 30 fits in the end of the small diameter portion of the cartridge case 21 to slidably and rotatably contact the end of the small diameter portion. The lever 29 is connected to the lever guide 30 by a pin 31 penetrating the circumferential wall of the lever guide 30 to be rotatable around the pin 31. The lever 29 slidably and movably contacts the circumferential wall of rectangular-shaped central opening of the lever guide 30 at a boss 29a penetrated by the pin 31.

One end 29b of the lever 29 inserted in the cartridge case 21 is inserted in the concave 27b of the second disk 27 through the central opening of the third disk 28. The end 29b slidably and movably contacts an adapter 32 made of synthetic resin and fitted in the concave 27b. The end 29b engages the concave 27b through the adapter 32. The end 29b can swing around the pin 31 but cannot rotate relative to the concave 27b around the central axis Y of the concave 27b.

A closed space 33 is formed radially outside the second disk 27 and between the first disk 25 and the third disk 28. The first through hole 25a of the first disk 25 always communicates with the closed space 33 through the groove 25d formed on the end face 25' of the first disk 25.

Operation of the disk valve B will be described.

In the condition shown in FIG. 3, the concave 27a communicates with the third through hole 25c, but does not communicate with either the first through hole 25a or the second through hole 25b. The first through hole 25a, the second through hole 25b and the third through hole 25c are closed by the second disk 27. Hot water supplied from the hot water inlet port of a faucet body to the first through hole 25a flows into the closed space 33 always communicating with the first through hole 25a through the groove 25d to fill up the closed space 33 with the hot water. The part of the end face 25' opposing the closed space 33 always contacts water.

The mirror finished end face 25' tightly contacts the mirror finished end face 27' to seal the slidably and movably contacting part between the first disk 25 and the second disk 27. The hot water charged in the first through hole 25a and the closed space 33, and the cool water charged in the second through hole 25b do not flow into the third through hole 25c. Therefore, mixed water does not discharge from the disk valve B into the mixed water outlet port of the faucet body.

The mirror finished end face 27" tightly contacts the mirror finished end face 28' to seal the slidably and movably contacting part between the second disk 27 and the third disk 28. The end face 27" of the second disk 27 always covers the central opening of the third disk 28. Therefore, the hot water charged in the first through hole 25a and the closed space 33 does not leak to the end of the small diameter portion of the cartridge case 21 and does not leak from the disk valve B.

When the lever 29 rotates anticlockwise around the pin 31 in FIG. 3, the second disk 27 slides relative to the first disk 25 and the third disk 28, and the disk valve B comes into the condition shown in FIG. 5. In said condition, the concave 27a communicates with the first through hole 25a, the second through hole 25b and the third through hole 25c. The hot water supplied to the first through hole 25a through the hot water inlet port of the faucet body and the cool water supplied to the second through hole 25b through the cool water inlet port of the faucet body flow into the third through hole 25c through the concave 27. Thus, mixed water discharges from the disk valve B into the mixed water outlet port of the faucet body. The flow rate of the mixed water discharging from the disk valve B is controlled by controlling the rotating angle of the lever 29 around the pin 31.

When the lever 29 rotates around an axis Y1 crossing the central axis of the pin 31 at right angles and extending in parallel with the axis Y, the second disk 27 slidably rotates relative to the first disk 25 and the third disk 28, and the concave 27a communicates with the first through hole 25a and the third through hole 25c. The hot water supplied to the first through hole 25a through the hot water inlet port of the faucet body flows into the third through hole 25c through the concave 27a. Thus, the hot water discharges from the disk valve B into the mixed water outlet port of the faucet body.

When the lever 29 rotates around the axis Y1, the second disk 27 slidably rotates relative to the first disk 25 and the third disk 28, and the concave 27a communicates with the second through hole 25b and the third through hole 25c. The cool water supplied to the second through hole 25b through the cool water inlet port of the faucet body flows into the third through hole 25c through the concave 27a. Thus, the cool water discharges from the disk valve B into the mixed water outlet port of the faucet body.

When the rotating angle of the lever 29 around the axis Y1 is controlled, the degree of overlap between the concave 27a and the first through hole 25a is controlled and the degree of overlap between the concave 27a and the second through hole 25b is controlled, whereby the mixing ratio of hot water and cool water is controlled to control the temperature of the mixed water discharging from the disk valve B.

In the disk valve B, no oil is necessary for lubricating the slidably and movably contacting part between the first disk 25 and the second disk 27, and the slidably and movably contacting part between the second disk 27 and the third disk 28 because the end face 27' and 27" are coated with a self-lubricating material and the slidably and movably contacting part between the first disk 25 and the second disk 27, and the slidably and movably contacting part between the second disk 27 and the third disk 28 are self-lubricated. Therefore, dispersing of oil into discharging water is suppressed.

The slidably and movably contacting part between the first disk 25 and the second disk 27, and the slidably and movably contacting part between the second disk 27 and the third disk 28 are self-lubricated when they are covered by water films. In the disk valve B, the part of the end face 25' opposing the closed space 33 and the part of the end face 28' opposing the closed space 33 always contact water because the closed space 33 always communicating with the first through hole 25a through the groove 25d is always filled with the water. Therefore, at the same time as the second disk 27 slides relative to the first disk 25 and the third disk 28, the slidably and movably contacting part between the first disk 25 and the second disk 27, and the slidably and movably contacting part between the second disk 27 and the third disk 28 are covered by water films and self-lubricated. Therefore, a small force applied to the lever 29 can easily slide the second disk 27 relative to the first disk 25 and the third disk 28.

When the disk valve B is kept in closed condition for a long time, the sliding resistance when the second disk 27 starts to slide relative to the first disk 25 and the third disk 28 might be expected to increase if the water films covering the sliding contacting parts should be diminished by drying. In the disk valve B, however, the increase of the sliding resistance is prevented for the following reason. The first disk 25 is always forced against the second disk 27 by the primary pressure, i.e. the pressure upstream side of the disk valve. In the disk valve B, the primary pressure also always works on the part of the end face 25' of the first disk 25 opposing the closed space 33 to force the first disk 25 away from the second disk 27, thereby decreasing the load acting on the slidably and movably contacting part between the first disk 25 and the second disk 27, and the load acting on the slidably and movably contacting part between the second disk 27 and the third disk 28. Therefore, even if the slidably and movably contacting parts lack water films when the second disk 27 starts to slide relative to the first disk 25 and the third disk 28, the increase of the sliding resistance is suppressed, and the second disk 27 can easily slide relative to the first disk 25 and the third disk 28. As a result, a small force applied to the lever 29 can easily slide the second disk 27 relative to the first disk 25 and the third disk 28.

In the disk valve B, good maneuverability is maintained for a long time because the second disk 27 can easily start to slide relative to the first disk 25 and the third disk 28, and the slidably and movably contacting parts among them are covered by water films to be self-lubricated at the same time as the second disk 27 starts to slide relative to the first disk 25 and the third disk 28.

In the disk valve B, the closed space 33 is formed between the first disk 25 slidably and movably contacting the second disk 27 and the third disk 28 slidably and movably contacting the second disk 27. Therefore, the closed space 33 can be sealed easily and leakage of water from the closed space 33, especially leakage of water from the closed space 33 to the small diameter portion of the cartridge case 21 can be easily prevented by mirror finishing the end faces 25', 27', 27'', 28' to seal the slidably and movably contacting parts between the second disk 27 and the first disk 25, and the second disk 27 and the third disk 28.

Primary pressure works in the closed spaces 14 and 33. Therefore, the cartridge cases 1 and 21 opposing the closed spaces 14 and 33 are desirably made of high strength material such as PPS (polyphenylene sulfide), PTFE (polytetrafuluoroethylene), PEEK (poly ether ether ketone), PSU (polysulfone), or the like. PPS is markedly desirable because it can be used for various purposes.

The disk valves A, B can be used for a single lever water combination faucet, wherein a single lever is swung and rotated to control the temperature and the flow rate of discharging water.

It is possible to delete the cool water inlet ports 2b, 22b, and the second through holes 5b, 25b, disable rotations of the levers 9, 29 around the axes X1, Y1, allow control of the degree of overlap between the concaves 7a, 27a and the first through holes 5a, 25a only, and connect the hot water inlet ports 2a, 22a to the cool water inlet port of a faucet body. Then, the disk valves A, B can be used in a water faucet in witch a lever is swung to adjust the flow rate of the discharging cool water.

The second through holes 5b, 25b can be always communicated with the closed spaces 14, 33 through the grooves formed on the end faces 5', 25'.

When hot water is supplied to the first through holes 5a, 25a from an electrical water heater, etc., a pressure reducing valve is disposed upstream of the first through holes 5a, 25a. Therefore, even if the first through holes 5a, 25a are always communicated with the closed spaces 14, 33, only low pressures of hot water cancel each other between the opposite end faces of the first disks 5, 25 and high pressures of cool water do not cancel each other. As a result, the load acting on the slidably and movably contacting parts between the first disks 5, 25 and the second disks 7, 27 are not decreased so much. Therefore, when pressure reducing valves are disposed upstream of the first through holes 5a, 25a, the second through holes 5b, 25b are desirably always communicated with the closed spaces 14, 33.

The first through holes 5a, 25a need not necessarily oppose the closed spaces 14, 33 through the grooves 5d, 25d. The first through holes 5a, 25a can be designed to always oppose the closed spaces 14, 33 at a part of the end opening to the end faces 5', 25'.

The first through hole 5a and the second through hole 5b can be always communicated with the closed space 14. The first through hole 25a and the second through hole 25b can be always communicated with the closed space 33. In these cases, a check valve is desirably disposed upstream of each through hole to prevent back flow from one through hole to the other.

The second disk 7 can be provided with a through hole instead of the concave 7a. In this case, the contacting part between the gripper 8 and the second disk 7 should be provided with an O-ring or the like, around the hole to seal the contacting part around the hole.

A little oil such as silicon grease can be applied on the central portion of the end face 27'' of the second disk 27. When the second disk 27 starts to slide relative to the first disk 25 and the third disk 28 after the disk valve B has been closed for a long time, the sliding resistance between the second disk 27 and the third disk 28 is decreased. Thus, the second disk 27 can easily slide relative to the first disk 25 and the third disk 28. The oil scarcely disperses into the water passing through the disk valve B because the central portion of the end face 27'' of the second disk 27 does not directly contact the water passing through the disk valve B.

Figure 6:
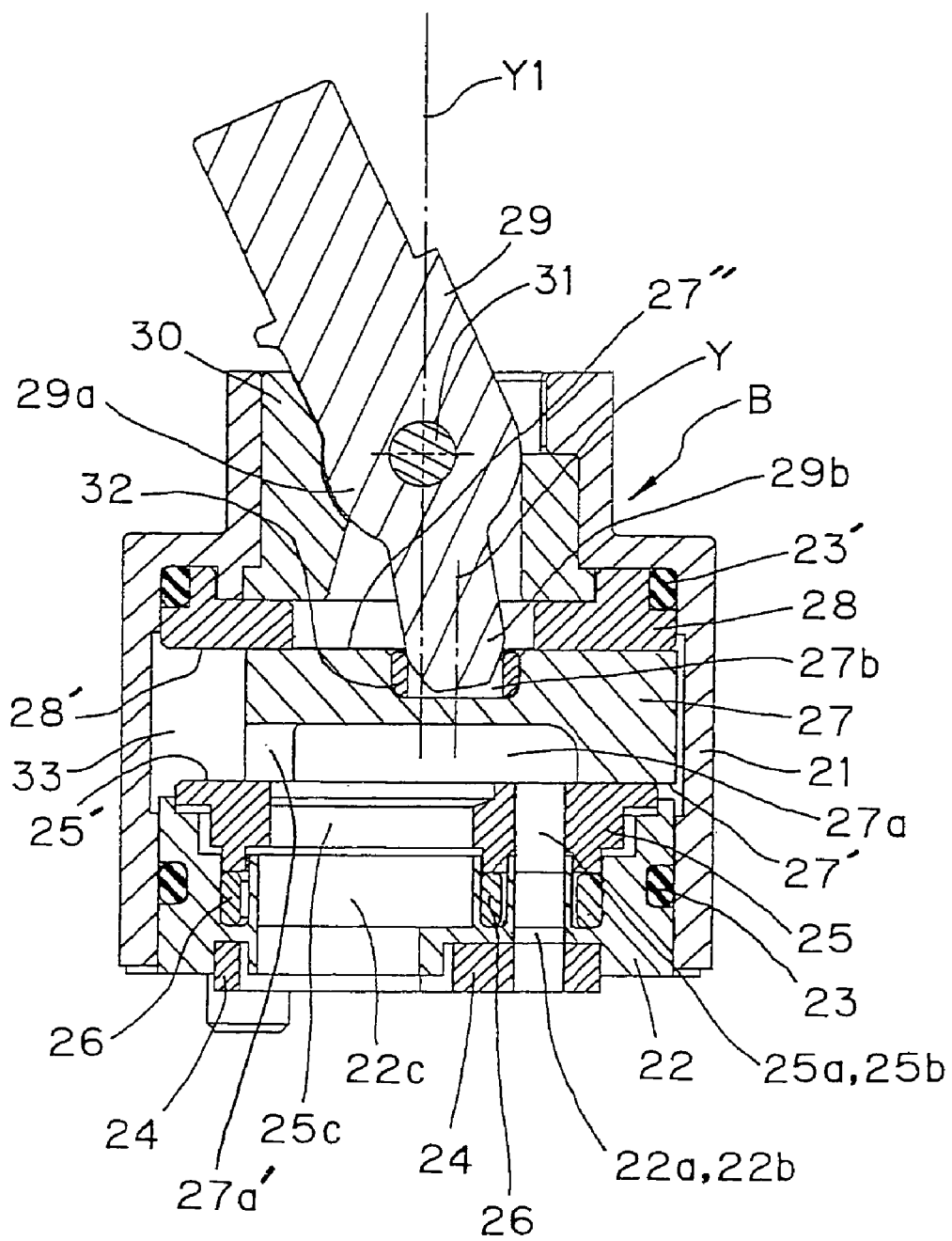
FIG. 6 is a sectional view of a variation of the disk valve in accordance with the second preferred embodiment of the present invention.

As shown in FIG. 6, it is possible to delete the groove 25d on the end face 25' and form a cutout or opening 27a' in a part of the circumferential wall of the concave 27a. When the concave 27a communicates with the first through hole 25a and/or the second through hole 25b, hot water and/or cool water flows into the closed space 33 through the cutout or opening 27a' to be stored there, thereby wetting the part of the end faces 25' and 28' opposing the closed space 33. As a result, at the same time as the second disk 27 slides relative to the first disk 25 and the third disk 28, the slidably and movably contacting part between the first disk 25 and the second disk 27, and the slidably and movably contacting part between the second disk 27 and the third disk 28 are covered by water films and self-lubricated. When the disk valve B is kept in closed condition for a long time, the hot water and/or the cool water in the closed space 33 flows out the disk valve B through the cutout or opening 27a', the concave 27a, the third through hole 25c and the mixed water outlet port 22c. However, it is possible to retain the hot water and/or the cool water in the closed space 33 by decreasing the cross sectional area of the cutout or opening 27a', thereby keeping the part of the end face 25' and 28' opposing the closed space 33 in wet condition.

Figure 7:
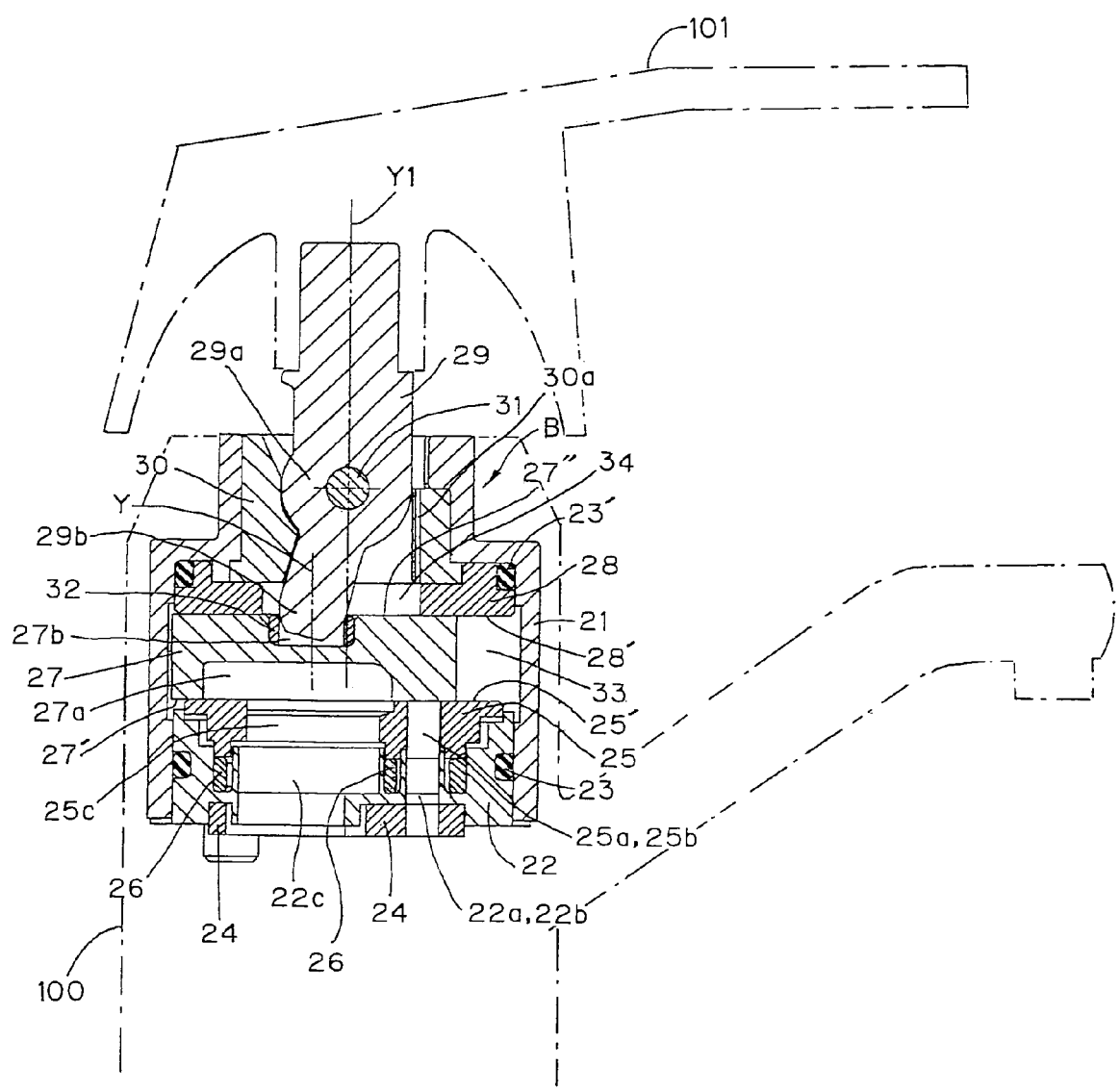
FIG. 7 is a sectional view of a variation of the disk valve in accordance with the second preferred embodiment of the present invention.

As shown in FIG. 7, when applying a little oil to the central portion of the end face 27" of the second disk 27 in the disk valve B, it is possible to place a second closed space 34 formed in the cartridge case 21 adjacent to the closed space 33 and separated from the closed space 33 by the second disk 27 and the third disk 28 into communication with the space outside the cartridge case 21 through a small diameter hole 30a operating as an oil supply passage formed in the circumferential wall of the lever guide 30 and penetrating the circumferential wall of the lever guide 30 in the longitudinal direction.

The disk valve B is assembled with a faucet body 100 of a single lever water combination faucet. A faucet lever 101 is connected to the lever 29. When the disk valve B is assembled with a faucet body 100 of a single lever water combination faucet, the lever guide 30 is exposed to the open space outside the faucet body 100 at the end face where the small diameter hole 30a opens.

It is possible to supply the second closed space 34 with oil from the open space outside the cartridge case 21 through the small diameter hole 30a, thereby supplying the central portion of the end face 27" of the second disk 27 with oil through the central opening of the third disk 28. Therefore, the disk valve B can be used for a long time without suffering from lack of oil.

When the disk valve B is assembled with a faucet body 100 of a single lever water combination faucet, the lever guide 30 is exposed to the open space outside the faucet body 100 at the end face where the small diameter hole 30a opens. Therefore, the second closed space 34 can be supplied with oil from the open space outside the cartridge case 21 through the small diameter hole 30a, without taking the disk valve B out of the faucet body 100. Therefore, the disk valve B can be easily supplied with oil.

A water faucet comprising disk valve A or B can suppress the dispersion of oil into the discharging water and keep high maneuverability for a long time.

INDUSTRIAL APPLICABILITY OF THE INVENTION

The disk valve in accordance with the present invention can be used for single lever water combination faucets, water faucets, etc.

The invention claimed is:

1. A disk valve comprising an inlet port, an outlet port, a first disk provided with a first through hole communicating with the inlet port and extending axially and a second through hole communicating with the outlet port and extending axially, and a second disk provided with a concave capable of communicating with the first through hole and the second through hole of the first disk on one end face and slidably and movably contacting one end face of the first disk at the one end face, wherein a closed space is formed radially outside the second disk, and the second disk slides relative to the first disk to adjust the degree of overlap between the concave of the second disk and the first through hole of the first disk, and wherein the slidably and movably contacting part between the first disk and the second disk is self-lubricated, further comprising a communication passage for always placing the first through hole into communication with the closed space radially outside the second disk, and wherein a portion of the one end face of the first disk adjacent to the part slidably and movably contacting the second disk opposes the closed space and the communication passage is a groove formed on the one end face of the first disk.

2. A disk valve of claim 1, further comprising an annular third disk slidably and movably contacting the other end face of the second disk at one end face, wherein the second disk contacts the third disk to always cover the central opening of the third disk and slides relative to the third disk, the slidably and movably contacting part between the second disk and the third disk is self-lubricated, and a part of the one end face of the third disk adjacent to the part slidably and movably contacting the second disk opposes the closed space.

3. A disk valve of claim 2, further comprising a lever that passes through the central opening of the third disk to engage the second disk and a casing for accommodating the first disk, second disk and the third disk, wherein a second closed space is formed in the casing adjacent to the closed space radially outside the second disk and separated from the closed space radially outside the second disk by the second disk and the third disk, and further comprising an oil supply passage for placing the second closed space into communication with the open space outside the casing.

4. A disk valve of claim 3, wherein the oil supply passage is formed in a portion of the disk valve exposed to the space outside a faucet body with which the disk valve is assembled.

5. A disk valve of claim 1, wherein the inlet port is provided with a hot water inlet port and a cool water inlet port which are independent of each other, the first through hole of the first disk is provided with a hole communicating with the hot water inlet port and a hole communicating with the cool water inlet port, the concave of the second disk is capable of communicating with the hole of the first disk communicating with the hot water inlet port and the hole of the first disk communicating with the cool water inlet port, the second disk slides relative to the first disk to adjust the degree of overlap between the concave of the second disk and the hole of the first disk communicating with the hot water inlet port and the degree of overlap between the concave of the second disk and the hole of the first disk communicating with the cool water inlet port, and the communication passage for placing the first through hole of the first disk into communication with the closed space radially outside the second disk places the hole of the first disk communicating with the hot water inlet port and, optionally, the hole of the first disk communicating with the cool water inlet port into communication with the closed space radially outside the second disk.

6. A water faucet comprising the disk valve of claim 1.

7. A disk valve comprising an inlet port, an outlet port, a first disk provided with a first through hole communicating with the inlet port and extending axially and a second through hole communicating with the outlet port and extending axially, and a second disk provided with a concave capable of communicating with the first through hole and the second through hole of the first disk on one end face and slidably and movably contacting one end face of the first disk at the one end face, wherein a closed space is formed radially outside the second disk, and the second disk slides relative to the first disk to adjust the degree of overlap between the concave of the second disk and the first through hole of the first disk, and wherein the slidably and movably contacting part between the first disk and the second disk is self-lubricated, further comprising a communication passage for always placing the first through hole into communication with the closed space radially outside the second disk, and wherein a portion of the one end face of the first disk adjacent to the part slidably and movably contacting the second disk opposes the closed space and the communication passage is a part of the end portion of the first through hole formed in the first disk at the side of the one end face of the first disk.

8. A disk valve comprising an inlet port, and outlet port, a first disk provided with a first through hole communicating with the inlet port and extending axially and a second through hole communicating with the outlet port and extending axially, and a second disk provided with a concave capable of communicating with the first through hole and the second through hole of the first disk on one end face and slidably and movably contacting one end face of the first disk at the one end face, wherein a closed space is formed radially outside the second disk, and the second disk slides relative to the first disk to adjust the degree of overlap between the concave of the second disk and the first through hole of the first disk, further comprising an annular third disk slidably and movably contacting the other end face of the second disk at one end face, wherein the second disk contacts the third disk to always cover the central opening of the third disk and slides relative to the third disk, the slidably and movably contacting part between the first disk and the second disk and the slidably and movably contacting part between the second disk and third disk are self-lubricated, a portion of the one end face of the first disk adjacent to the part slidably and movably contacting the second disk and a portion of the one end face of the third disk adjacent to the part slidably and movably contacting the second disk oppose the closed space, and a communication passage is formed in the side wall of the concave of the second disk to place the concave into communication with the closed space.

* * * * *